(12) United States Patent
Kwon et al.

(10) Patent No.: US 10,875,568 B2
(45) Date of Patent: Dec. 29, 2020

(54) STEERING COLUMN FOR VEHICLE

(71) Applicant: MANDO CORPORATION, Gyeonggi-do (KR)

(72) Inventors: HyunBi Kwon, Gyeonggi-do (KR); Sang Hyun Park, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 118 days.

(21) Appl. No.: 16/151,299

(22) Filed: Oct. 3, 2018

(65) Prior Publication Data

US 2019/0161108 A1 May 30, 2019

(30) Foreign Application Priority Data

Nov. 28, 2017 (KR) .................... 10-2017-0160357

(51) Int. Cl.
*B62D 1/19* (2006.01)
*B62D 1/184* (2006.01)

(52) U.S. Cl.
CPC ............ *B62D 1/192* (2013.01); *B62D 1/184* (2013.01); *B62D 1/195* (2013.01)

(58) Field of Classification Search
CPC ................................ B62D 1/192; B62D 1/195
See application file for complete search history.

(56) References Cited

U.S. PATENT DOCUMENTS

| 9,926,001 B2* | 3/2018 | Sawall | B62D 1/184 |
| 2013/0074641 A1* | 3/2013 | Schnitzer | G05G 5/06 |
| | | | 74/493 |
| 2015/0266495 A1* | 9/2015 | Yoshihara | B62D 1/195 |
| | | | 74/493 |
| 2016/0075367 A1* | 3/2016 | Sakuda | B62D 1/185 |
| | | | 74/493 |
| 2016/0257333 A1* | 9/2016 | Ku | B62D 1/181 |

(Continued)

FOREIGN PATENT DOCUMENTS

| DE | 10 2009 009 577 | 5/2010 |
| DE | 10 2010 061 268 | 6/2012 |

(Continued)

OTHER PUBLICATIONS

Office Action dated Jan. 11, 2019 for Korean Patent Application No. 10-2017-0160357 and its English machine translation by Google Translate.

(Continued)

*Primary Examiner* — James A English
(74) *Attorney, Agent, or Firm* — Ladas & Parry, LLP

(57) ABSTRACT

An embodiment of the present disclosure provides a steering column of vehicle which includes an upper column with a fixing plate having a latching groove on an outer surface thereof, a lower column coupled to an outer surface of the upper column with a mounting hole on a side facing to the fixing plate, and an impact absorbing module, wherein the impact absorbing module includes a module cover covering the mounting hole and being coupled to the lower column, a latching element detachably coupled to the latching groove, a module body rotatably coupled to the latching element via an elastic element, and a bending plate which one end is coupled to the module body and bended other end is coupled to the module cover.

20 Claims, 13 Drawing Sheets

(56) References Cited

U.S. PATENT DOCUMENTS

| | | | | |
|---|---|---|---|---|
| 2016/0288821 A1* | 10/2016 | Sakuda | ................. | B62D 1/185 |
| 2018/0050719 A1* | 2/2018 | Agbor | ................... | B62D 1/184 |
| 2018/0208233 A1* | 7/2018 | Kwon | ................... | B62D 1/195 |
| 2018/0281839 A1* | 10/2018 | Bouvier | ................ | B62D 1/185 |

FOREIGN PATENT DOCUMENTS

| | | |
|---|---|---|
| DE | 11 2015 002 019 | 2/2017 |
| JP | 2016-60337 | 4/2016 |
| KR | 10-2007-0023305 | 2/2007 |
| KR | 10-1559821 | 10/2015 |

OTHER PUBLICATIONS

Office Action dated Jan. 22, 2020 for German Patent Application No. 10 2018 125 045.2 and its English machine translation by Google Translate.

* cited by examiner

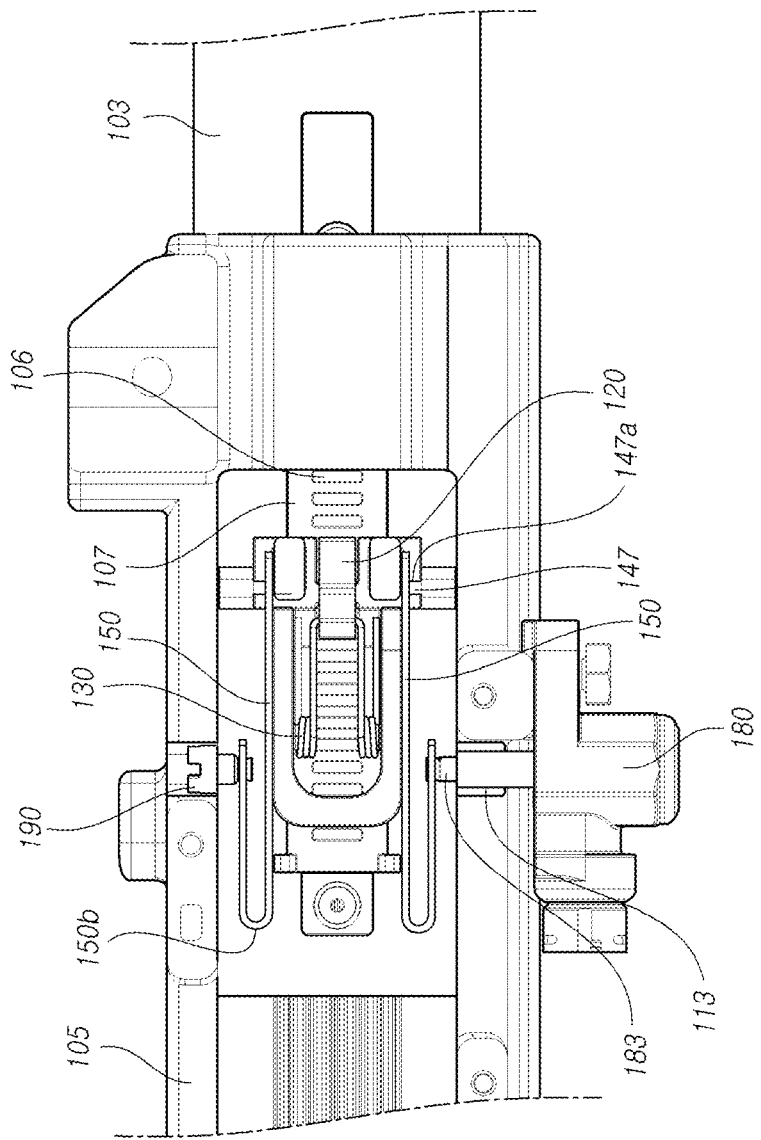

STEERING COLUMN FOR VEHICLE

CROSS REFERENCE TO RELATED APPLICATION

This application claims priority from Korean Patent Application No. 10-2017-0160357, filed on Nov. 28, 2017, which are hereby incorporated by reference for all purposes as if fully set forth herein.

BACKGROUND OF THE INVENTION

1. Field of the Invention

The embodiments of the present disclosure relate to a steering column for vehicle. More particularly, present disclosure relates to a steering column for vehicle that a collapse sliding part and a fixed part are not interfered with each other in a collision of an vehicle to smoothly collapsed, control of the collapse load of the steering column is facilitated, collision performance is improved by controlling the collapse load according to the collision characteristics of each type of the vehicle, thereby the number of parts, the assembling process and cost is reduced.

2. Description of the Prior Art

Generally, a steering column of vehicle includes functions of telescope and tilt, and these functions allow a driver to operate steering efficiently by adjusting a projection degree and a tilt angle of the steering wheel according to his or her height or body shape.

However such a steering column of vehicle has a problem to be mounted additional structure and a large number of parts for providing with a collision energy absorbing parts such as a capsule to be coupled to a mounting bracket so as to absorb collision energy in the event of an vehicle collision, a tearing plate, and a bending plate, and has another problem such as an increase of the number of components and work processes for separately fabricating and assembling them.

In addition, a impact absorbing method that fractures a tearing groove forming groove with a constant depth when a secondary load is absorbed by the tearing plate after absorbing a primary load by fracturing the capsule, is complicated in manufacturing of the product, and has a problem to arise a lateral deviation of the load due to the interference with peripheral components.

SUMMARY OF THE INVENTION

Accordingly, the embodiments of the present disclosure have been made in view of the background described above, and are to provide a steering column for vehicle that a collapse sliding part and a fixed part are not interfered with each other in a collision of an vehicle to smoothly collapsed.

In addition, the embodiments of the present disclosure are to provide that control of the collapse load of the steering column is facilitated, and at the same time, collision performance is improved by controlling the collapse load according to the collision characteristics of each type of the vehicle, thereby the number of parts, the assembling process and cost is reduced.

Further, the objects of the embodiments are not limited thereto, and other objects not mentioned herein may be clearly understood by those skilled in the art from the following description.

To achieve the above object, an embodiment of the present disclosure provides a steering column of vehicle which includes an upper column with a fixing plate having a latching groove on an outer surface thereof, a lower column coupled to an outer surface of the upper column with a mounting hole on a side facing to the fixing plate, and an impact absorbing module, wherein the impact absorbing module includes a module cover covering the mounting hole and being coupled to the lower column, a latching element detachably coupled to the latching groove, a module body rotatably coupled to the latching element via an elastic element, and a bending plate which one end is coupled to the module body and bended other end is coupled to the module cover.

According to the present embodiments as described above, the present disclosure provides an effect that a collapse sliding part and a fixed part are smoothly collapsed without interfering with each other in a vehicle collision.

In addition, according to the present embodiments, the present disclosure provides another effect that control of the collapse load of the steering column is facilitated, and at the same time, collision performance is improved by controlling the collapse load according to the collision characteristics of each type of the vehicle, thereby the number of parts, the assembling process and cost is reduced.

BRIEF DESCRIPTION OF THE DRAWINGS

FIGS. 12 and 13 are side views showing a state in which the steering column of vehicle is collapse sliding according to the present embodiments.

DETAILED DESCRIPTION OF THE EXEMPLARY EMBODIMENTS

Figure 1:
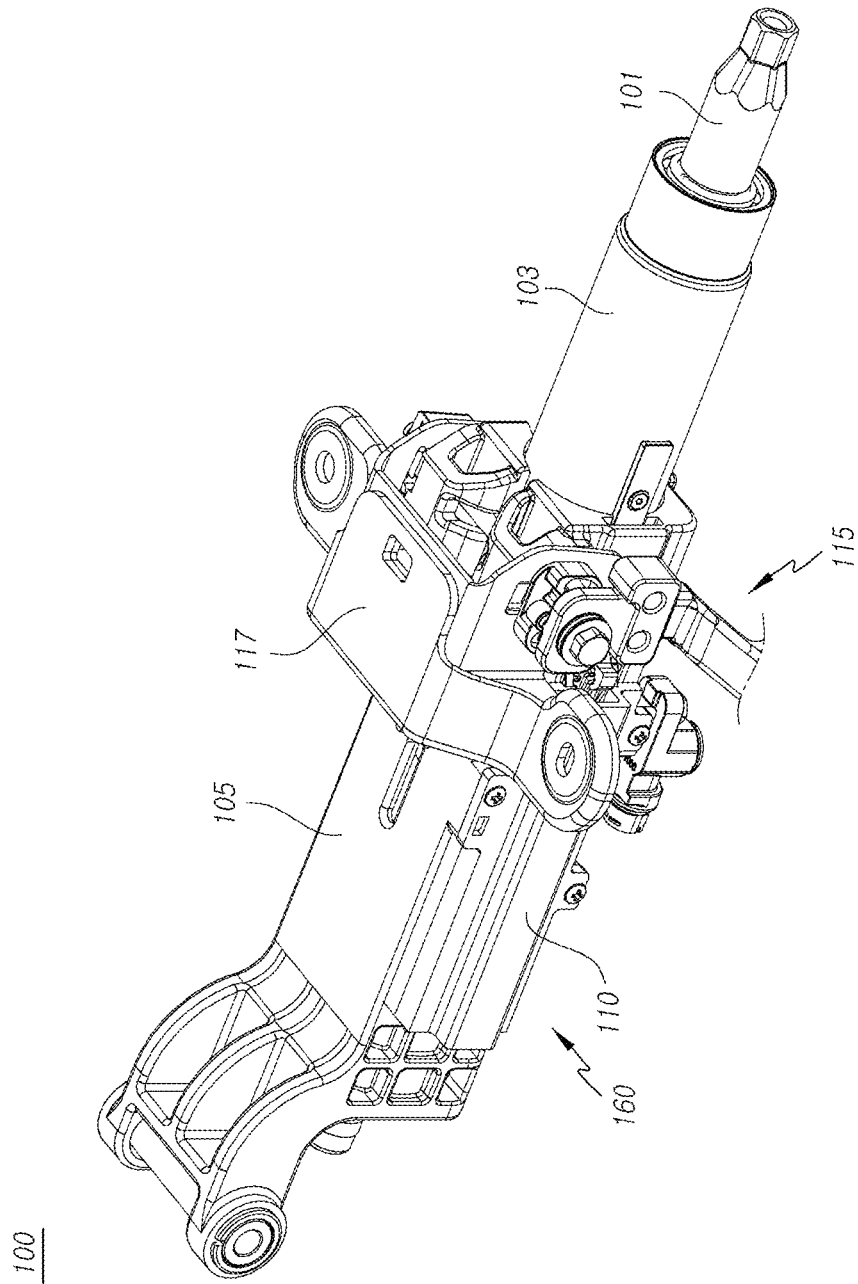
FIG. 1 is a perspective view showing a steering column of vehicle according to the present embodiment.

Hereinafter, embodiments of the present disclosure will be described in detail with reference to the accompanying drawings. In adding reference numerals to elements in each drawing, the same elements will be designated by the same reference numerals, if possible, although the elements are shown in different drawings. Further, in the following description of the present disclosure, a detailed description of known elements and functions incorporated herein will be omitted when it is determined that the description may make the subject matter of the present disclosure rather unclear.

In addition, when describing elements of the present disclosure, terms such as first, second, A, B, (a), (b), and the like may be used. These terms are only used to distinguish one element from another element, and these are not inteded to limit the essence, order, or sequence of the corresponding element. It will be understood that when an element is referred to as being "linked to," "coupled to," or "connected to" another element, it may be directly connected or coupled to another element, but one of more intervening element may be "linked," "coupled," or "connected" between each element.

Figure 2:
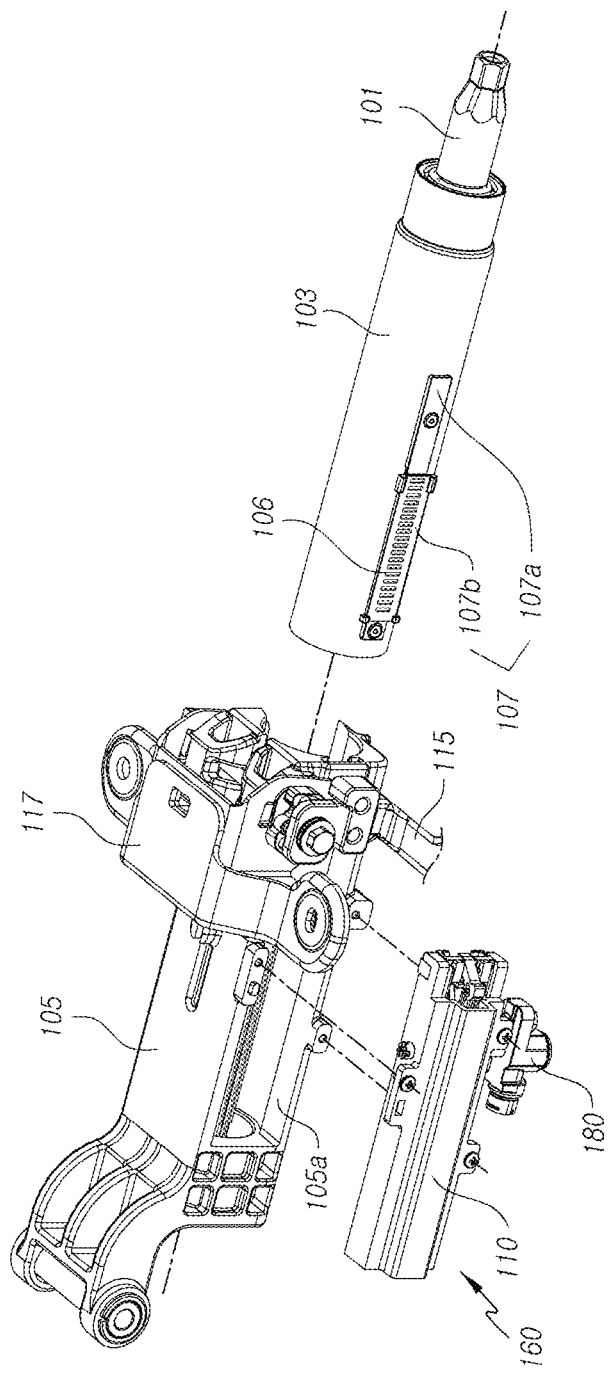
FIG. 2 and FIG. 3 are exploded perspective views showing a part of a steering column of vehicle according to the present embodiment.
Figure 3:
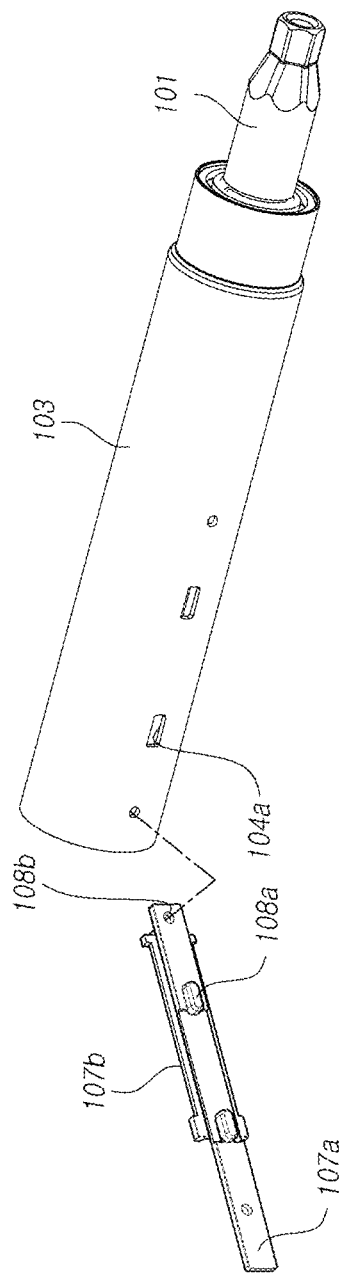
Figure 4:
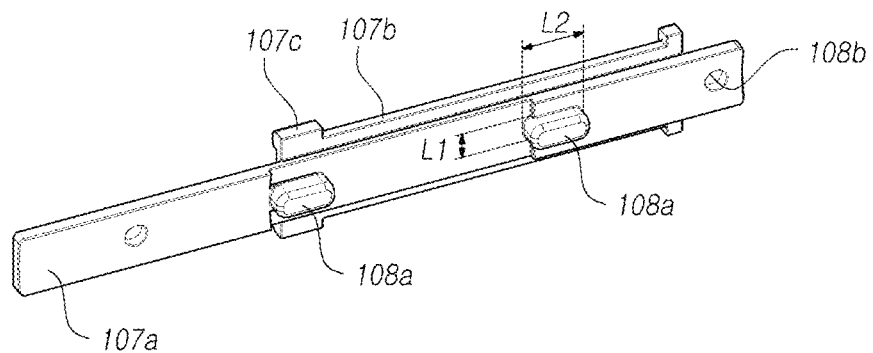
FIG. 4 is a perspective view showing a part of a steering column of vehicle according to the present embodiments.
Figure 5:
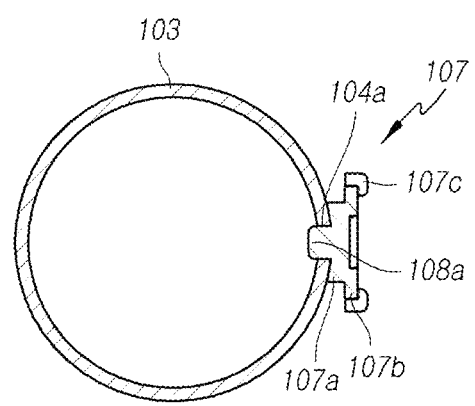
FIG. 5 is a sectional view showing a part of a steering column of vehicle according to the present embodiments.
Figure 6:
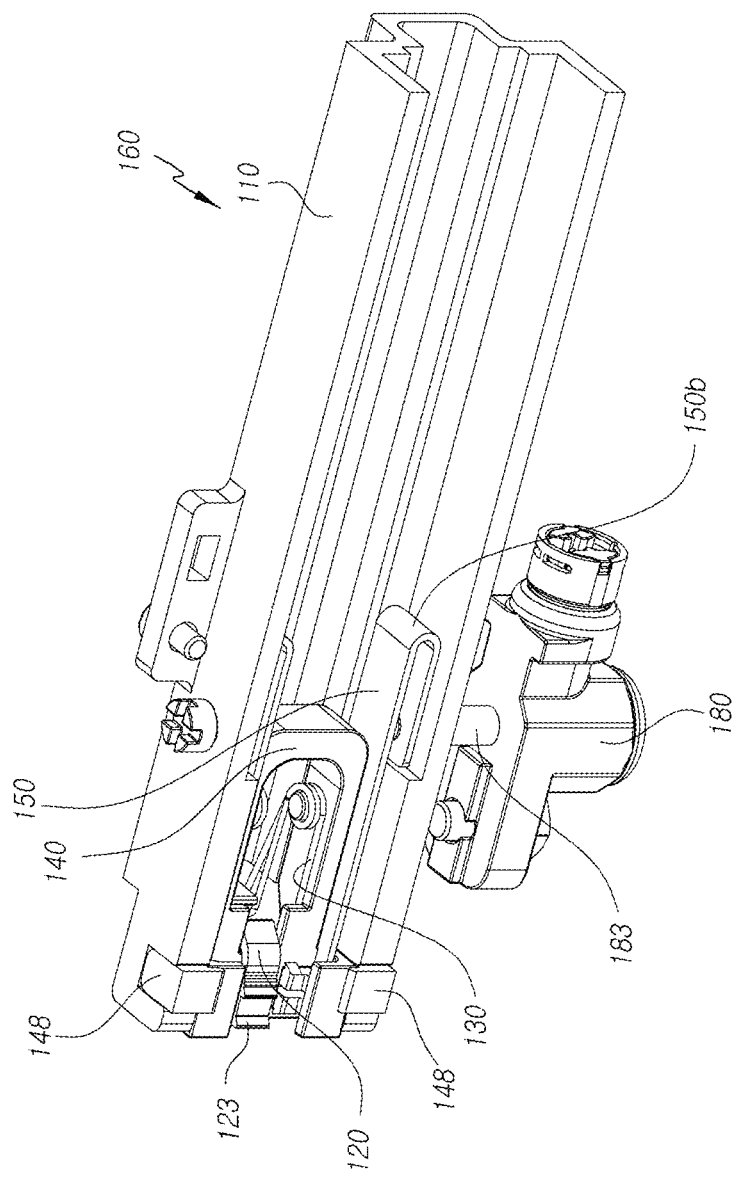
FIG. 6 and FIG. 7 are perspective views showing a part of a steering column of vehicle according to the present embodiments.
Figure 7:
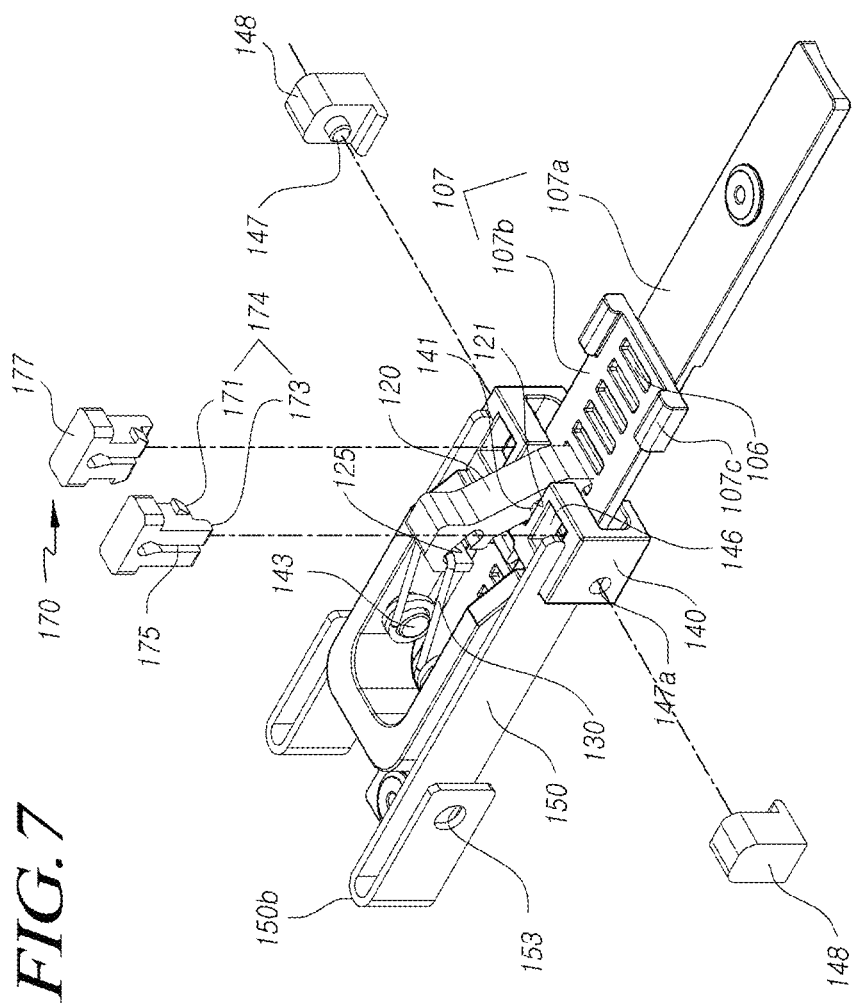
Figure 8:
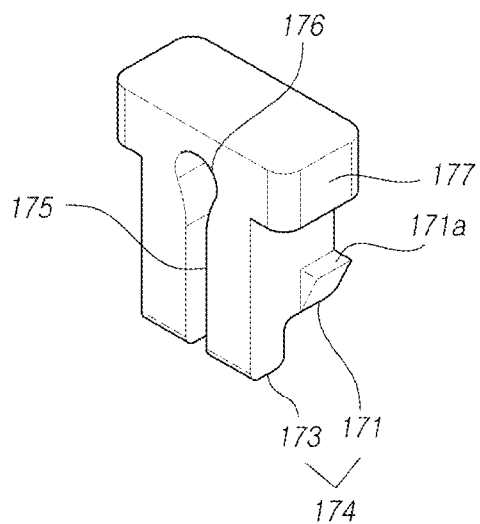
FIG. 8 and FIG. 9 are a perspective view and a front view showing a part of a steering column of vehicle according to the present embodiments.
Figure 9:
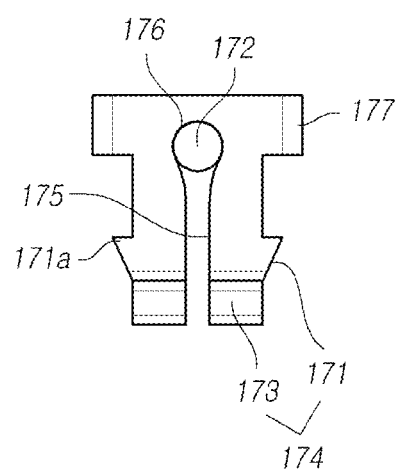
Figure 10:
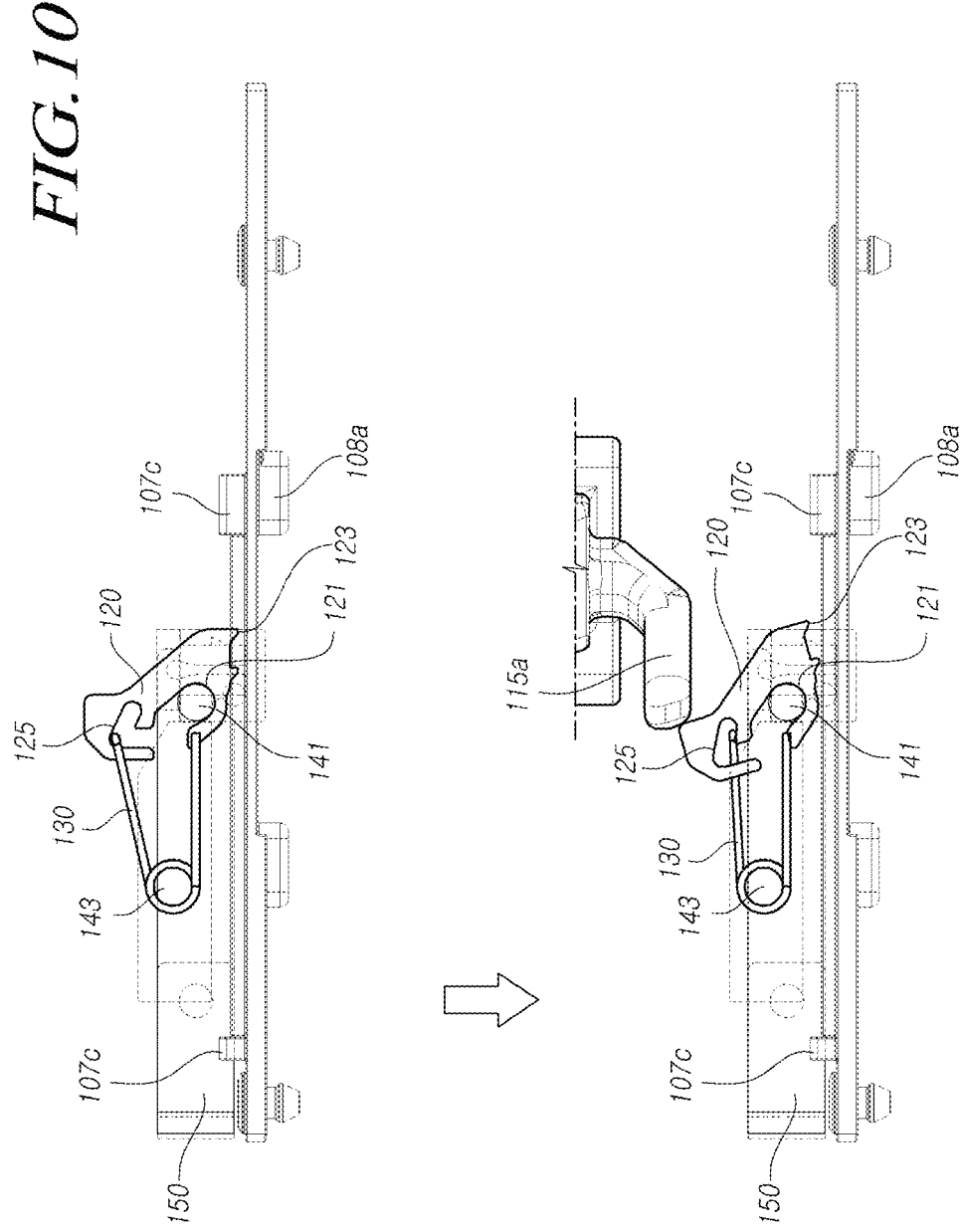
FIG. 10 is a side view showing a telescopic operation state for a steering column of vehicle according to the present embodiments.
Figure 11:
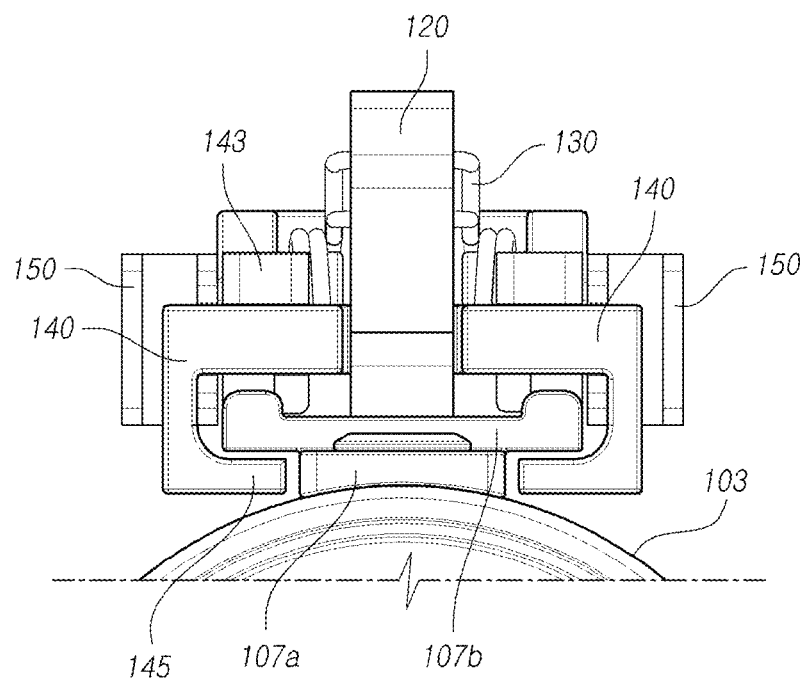
FIG. 11 is a front view showing a part of a steering column of vehicle according to the present embodiments.
Figure 12:
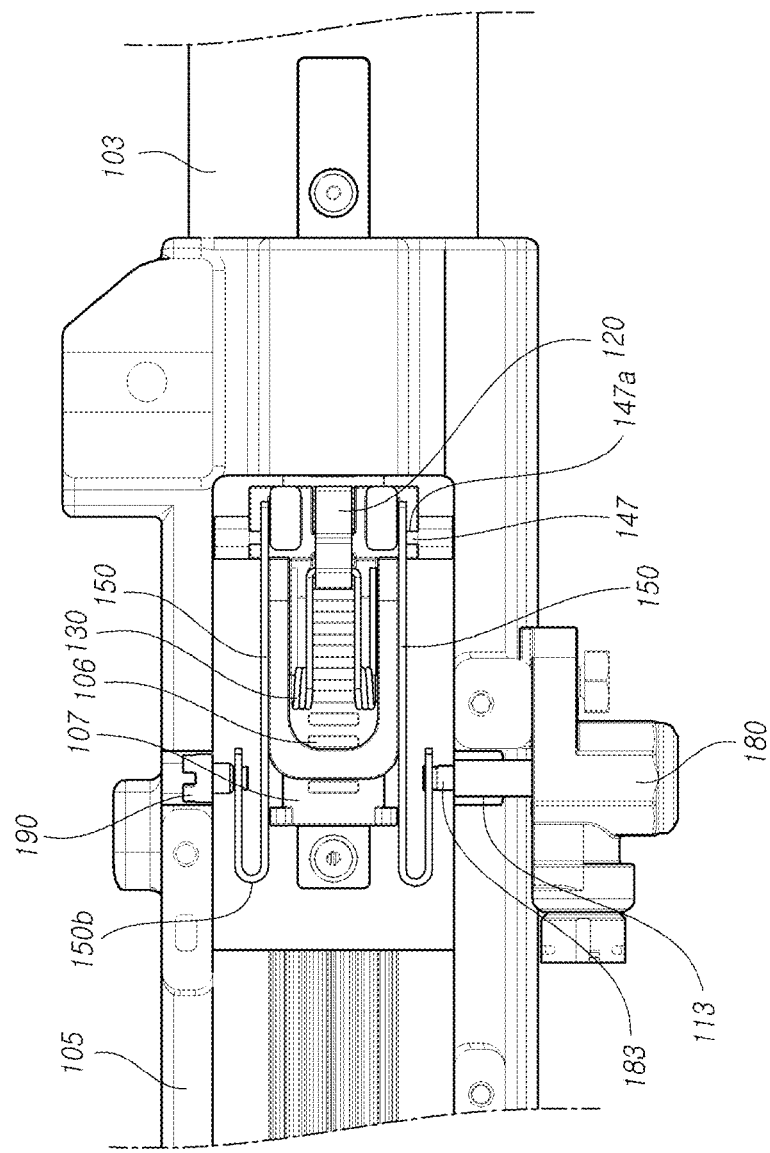

FIG. 1 is a perspective view showing a steering column of vehicle according to the present embodiment, FIG. 2 and FIG. 3 are exploded perspective views showing a part of a steering column of vehicle according to the present embodiment, FIG. 4 is a perspective view showing a part of a steering column of vehicle according to the present embodiments, FIG. 5 is a sectional view showing a part of a steering column of vehicle according to the present embodiments, FIG. 6 and FIG. 7 are perspective views showing a part of a steering column of vehicle according to the present embodiments, FIG. 8 and FIG. 9 are a perspective view and a front view showing a part of a steering column of vehicle according to the present embodiments, FIG. 10 is a side view showing a telescopic operation state for a steering column of vehicle according to the present embodiments, FIG. 11 is a front view showing a part of a steering column of vehicle according to the present embodiments, and FIGS. 12 and 13 are side views showing a state in which the steering column of vehicle is collapse sliding according to the present embodiments.

As shown in these drawings, the steering column of vehicle 100 according to the present embodiment includes an upper column 103 with a fixing plate 107 having a latching groove 106 on an outer surface thereof, a lower column 105 coupled to an outer surface of the upper column 103 with a mounting hole 105a on a side facing to the fixing plate 107, a module cover 110 covering the mounting hole 105a and being coupled to the lower column 105, a latching element 120 detachably coupled to the latching groove 106, a module body 140 rotatably coupled to the latching element 120 via an elastic element 130, and an impact absorbing module 160 with a bending plate 150 which one end is coupled to the module body 140 and bended other end is coupled to the module cover 110.

The steering column of vehicle 100 according to the present embodiment has a structure that the upper column 103 being inserted into the lower column 105 is telescopically movable in the axial direction, and collision energy is absorbed by the upper column 103 collapsing toward the lower column 105 when the vehicle is collided with.

The upper column 103 is provided outside of a steering shaft 101 to surround the steering shaft 101 which transmits the steering force when a driver operates the steering wheel, and inserted into the lower column 105 for collapsed operation by sliding to the lower column 105 in the event of vehicle collision.

The lower column 105 in which the upper column 103 is inserted, is fixed to a vehicle body by a mounting bracket 117.

The upper column 103 is formed in a hollow shape and is inserted into the inner surface of the lower column 105 to perform an axial sliding movement toward the inside of the lower column 105 during the collapsed operation.

The upper column 103 includes a fixing plate 107 with a plurality of latching groove 106 spaced apart from each other in the axial direction on one side of the outer surface thereof, so that axial telescope movement is occurred by the detachable latching element 120 is moved for the latching groove 106 during the telescope operation, and a collapsed movement, in which the upper column 103 is moved in a state where the latching element 120 is connected to, is occurred.

An impact absorbing module is mounted on the lower column 105 formed in a hollow shape so as to absorb collision energy while supporting the collapsed movement of the upper column 103 in the event of a vehicle collision.

That is, the lower column 105 surrounds the upper column 103 inserted in the inner side, and the mounting hole 105a formed at axially lengthy direction on a side of the lower column 105 facing to the fixing plate 107 in the upper column 103. And, the impact absorbing module 160 is mounted on the mounting hole 105a.

The impact absorbing module 160 includes a module cover 110 coupled to the lower column 105 covering the mounting hole 105a, a latching element 120 detachably coupled to the latching groove 106, a module body 140 rotatably coupled to the latching element 120 via an elastic element 130, and a bending plate 150 which one end is coupled to the module body 140 and bended other end is coupled to the module cover 110.

The latching element 120 includes a hinge hole 121 to be coupled with the hinge portion 141 of the module body 140, and a latching projection 123 which is inserted to the latching groove 106 of the latching plate 107 at one end spaced apart from the hinge hole 121. The elastic element 130 is coupled to a seating groove 125 which is formed at the other end spaced apart from the hinge hole 121 of the latching element 120.

The elastic element 130 is supported by a supporting projection 143 formed on the module body 140, and maintains a state that the latching projection 123 is engaged with the latching groove 106 by rotating the other end of the latching element 120 with respect to the hinge portion 141.

When the telescopic operation is required, an actuating projection 115a engaged in a control lever 115 supports the other end of the latching element 120 by rotating the control lever 115, and the latching projection 123 is detached from the latching groove 106 by rotating the control lever 115 in the opposite direction.

The fixing plate 107 includes a first plate 107a whose lower side is seated on the outer surface of the upper column 103, and a second plate 107b with a plurality of the latching grooves 106 which is formed in axial lengthy direction extended from the both upper side of the first plate 107a.

Also, an inserting projection 108a and a fastening hole 108b are formed on the lower side of the first plate 107a, and an inserting hole 104a in which the inserting projection 108a is inserted and a fastening hole 104b are formed on the outer surface of the upper column 103. Thus, it is fixed by fastening the fastening holes 108b and 104b with a fastening element after the inserting projection 108a is inserted into the inserting hole 104a.

The lower side of the first plate 107a is formed as a curved surface facing to the outer surface of the upper column 103. The inserting projections 108a may be provided with two or more spaced apart from the first plate 107a in the axial direction, and the inserting hole 104a may be provided respectively at a position facing to the inserting projection 108a.

The inserting projection 108a is formed to absorb an impact by breaking the inserting hole 104a in the axial direction from the inserting projection 108a when an impact load greater than a reference impact load for plastic deformation of the bending plate 150 is applied in the event of an vehicle collision.

That is, the inserting projection 108a absorbs a larger impact by tearing the inserting hole 104a and by breaking the outer surface of the upper column 103 subsequently, when the impact load larger than the reference impact load to be endurable by plastic deformation of the bending plate 150 is applied.

Therefore, the inserting projection 108a is formed so as to protrude inward of the upper column 103 for easy breaking the inserting hole 104a in the axial direction, and the length L2 in the axial direction is larger than the length L1 in the width direction.

Also, stopping projections 107c are formed at both axial ends of the second plate 107b, and a telescope supporting element 170 supported by the stopping projection 107c of the second plate 107b is formed at one end of the module body 140. Thus, the moving distance of the upper column 130 is limited by both stopping projections 107c through support of the fixing plate 107 with the telescope supporting element 170 when the upper column 103 slides by working of the telescope.

A through hole 146 to be coupled to the telescope supporting element 170 is formed on an upper side of the module body 140, such that the telescope supporting element 170 is coupled so as not to be detached.

The telescope supporting element 170 includes an insertion supporting portion 174 to be inserted into the through hole 146 of the module body 140, and an upper supporting portion 177 supported on an upper side of the module body 140 by extending from upper side of the insertion supporting portion 174 in both direction.

The insertion supporting portion 174 includes a first supporting portion 171 supported on the upper side of the second plate 107b, and a second supporting portion 173 supported on side of the second plate 107b by extending larger than the first supporting portion 171. Thus, the telescope is worked by supporting the upper and side of the second plate 107b during the telescopic operation.

Also, a fixing projection 171a is formed on side of the first supporting portion 171 with a tapered shape in the upper direction. Therefore, the upper supporting portion 177 and the fixing projection 171a are supported around the through hole 146 of the module body 140 so as not to be detached after the telescope supporting element 170 is inserted into and coupled with the through hole 146.

Moreover, the telescope supporting element 170 includes a slit groove 175 formed by cutting the first supporting portion 171 and the second supporting portion 173 to both sides in the axial direction of the second plate 107b, thus it acts as a damping element when it contacts with the stopping projection 107c which stops the telescopic operation.

An extended groove 176 is formed at inner and upper end of the slit groove 175 with a wider width than the split width of the slit groove 175. A damping element 172 may be coupled to the extended groove 176 to damp the impact and noise by contacting the second plate 170b with the stopping projection 107c.

Meanwhile, a coupling holes 147a coupled to one end of the bending plate 150 are formed at both side of one end of the module body 140 respectively, and are coupled to the module cover 110 by supporting from the coupling member 148 to which the coupling projections 147 are coupled in both side.

Also, a fixing holes 153 are formed at the other bended end of the bending plate 150 respectively, and a pipe hole 113 piped with the fixing hole 153 of the bending plate 150 is formed on both sides of the module cover 110. An actuator 180, in which a fixing pin 183 is inserted or removed through the fixing hole 153 or the pipe hole 113, is formed on at least one side of the module cover 110.

That is, one end of the bending plate 150 is coupled to both sides of the module body 140 respectively while the bending plate 150, which is axially moved and spread together with the upper column 103 being plastically deformed by the vehicle collision, is formed with one end parallel to the other end with respect to the bending portion 150b.

Also, the other end of the actuator 180 includes a fixing pin 183 or a fixing hole 153 coupled to a fastening element 190 to support one end of the bending plate 150 being moved in the collapsed direction together with the upper column 103. And the pipe hole 113 is formed on both sides of the module cover 110 faced to each of the fixing holes 153.

The other end of the bending plate 150 may be fixed for both side by the fastening element 190, or may be fixed for one side by the fastening element 190 and the other side by the fixing pin 183 of the actuator 180, or may be fixed for both side by the fixing pin 183 of the actuator 180. In these embodiments, a case being fixed for one side by the fastening element 190 and the other side by the fixing pin 183 of the actuator 180 was illustrated.

In here, the fixing pin 183 of the actuator 180 is operated by the signal of the electronic control unit, and the electronic control unit transmits a signal by determining the operation of the actuator 180 according to signals received from various sensors mounted on the vehicle.

Therefore, it is possible to control the most optimized collapse absorbing load according to the speed, acceleration, and the like of the vehicle.

That is, it is possible to determine the plastic deformation of the bending plate 150 due to the operation that the fixing pin 183 of the actuator 180 is inserted into the pipe hole 113 and fixing hole 153 when the collapse absorbing load is required to be high, and the fixing pin 183 of the actuator 180 is detached from the pipe hole 113 and fixing hole 153 when the collapse absorbing load is required to be low.

Also, a step portion 145 is formed at one lower end of the module body 140 with structure of bending and surrounding the both sides of the second plate 107b so as to be spaced apart from both sides of the first plate 107a.

Therefore, the first plate 107a and the second plate 107b are supported by the inner space of the step portion 145 of the module body 140 without interfering the collapse sliding of the upper column 103.

That is, the fixed lower column 105 may be engaged with the sliding upper column 103 due to a rotation moment by the mounting angle of the steering shaft 101 and the steering column 100 for the vehicle body in the event of an vehicle collision. Although the rotation moment from the collision, present disclosure makes the upper column 103 to proceed the collapse sliding without interfering by supporting the first plate 107a and the second plate 107b in the inner space of the step portion 145 of the module body 140.

According to the present embodiments with described structure and shape above, a collapse sliding part and a fixed part are smoothly collapsed without interfering with each other in a vehicle collision.

Moreover, according to the present embodiments, control of the collapse load of the steering column is facilitated, and at the same time, collision performance is improved by controlling the collapse load according to the collision characteristics of each type of the vehicle, thereby the number of parts, the assembling process and cost is reduced.

As described above, even though it has been described that all elements that constitute the embodiments of the present disclosure are coupled as one element or operate while being coupled to one another, the present disclosure is not necessarily limited to the embodiments. That is, all elements may be selectively coupled as one or more elements and may operate while being coupled to one another within the scope of the purposes of the present disclosure.

It is also to be understood that the terms such as "include", "comprise", or "have", as used herein, mean that a component can be implanted unless specifically stated to the contrary, but should be construed as including other elements. All terms including technical or scientific terms have the same meaning as commonly understood by one of ordinary skill in the art to which the embodiments belong, unless otherwise defined. Commonly used terms, such as predefined terms, should be interpreted to be consistent with the contextual meanings of the related art and are not to be construed as ideal or overly formal, unless explicitly defined in the embodiments.

The above-described embodiments of the present disclosure have been described only for illustrative purposes, and those skilled in the art will appreciate that various modifications and changes may be made thereto without departing from the essential features of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A steering column of a vehicle, comprising:
   an upper column with a fixing plate having a latching groove on an outer surface thereof;
   a lower column coupled to an outer surface of the upper column with a mounting hole on a side facing to the fixing plate; and
   an impact absorbing module,
   wherein the impact absorbing module includes a module cover covering the mounting hole and coupled to the lower column, a latching element detachably coupled to the latching groove, a module body rotatably coupled to the latching element via an elastic element, and a bending plate which one end is coupled to the module body and bended other end is coupled to the module cover.

2. The steering column of the vehicle of claim 1, wherein, the fixing plate includes a plurality of latching grooves spaced apart in the axial direction.

3. The steering column of the vehicle of claim 1, wherein, the latching element includes a hinge hole to be coupled with a hinge portion of the module body, and a latching projection which is inserted to the latching groove at one end spaced apart from the hinge hole.

4. The steering column of the vehicle of claim 3, wherein, the elastic element is coupled to a seating groove which is formed at the other end spaced apart from the hinge hole of the latching element, and a supporting projection for supporting the elastic element is formed on the module body.

5. The steering column of the vehicle of claim 1, wherein, an actuating projection is formed on a side of a control lever for supporting the other end of the latching element and rotating the control lever.

6. The steering column of the vehicle of claim 1, wherein, the fixing plate includes a first plate whose lower side is seated on the outer surface of the upper column, and a second plate with a plurality of the latching grooves.

7. The steering column of the vehicle of claim 6, wherein, an inserting projection is formed on the lower side of the first plate, and an inserting hole for being inserted the inserting projection is formed on the upper column.

8. The steering column of the vehicle of claim 7, wherein, the inserting projections are formed with two or more spaced apart from the first plate in the axial direction, and the inserting hole is formed at a position facing to the inserting projection.

9. The steering column of the vehicle of claim 7, wherein, the inserting projection is formed so as to protrude inward of the upper column of which the length in the axial direction is larger than the length in the width direction.

10. The steering column of the vehicle of claim 6, wherein, stopping projections are formed at both axial ends of the second plate, and a telescope supporting element supported by the stopping projection is formed at one end of the module body.

11. The steering column of the vehicle of claim 10, wherein, a through hole to be coupled to the telescope supporting element is formed on an upper side of the module body.

12. The steering column of the vehicle of claim 11, wherein, the telescope supporting element includes an insertion supporting portion to be inserted into the through hole, and an upper supporting portion supported on an upper side of the module body by extending from upper side of the insertion supporting portion in both direction.

13. The steering column of the vehicle of claim 12, wherein, the insertion supporting portion includes a first supporting portion supported on the upper side of the second plate, and a second supporting portion supported on side of the second plate by extending larger than the first supporting portion.

14. The steering column of the vehicle of claim 12, wherein, the telescope supporting element includes a slit groove formed by cutting the insertion supporting portion to both sides in the axial direction of the second plate.

15. The steering column of the vehicle of claim 14, wherein, an extended groove is formed at inner end of the slit groove with a wider width than the split width of the slit groove, and a damping element is coupled to the extended groove.

16. The steering column of the vehicle of claim 6, wherein, a step portion is formed at one lower end of the module body surrounding the both sides of the second plate so as to be spaced apart from both sides of the first plate.

17. The steering column of the vehicle of claim 1, wherein, a fixing hole is formed at the other bended end of the bending plate, a pipe hole piped with the fixing hole is formed on both sides of the module cover, and an actuator, in which a fixing pin is inserted or removed through the fixing hole or the pipe hole, is formed on at least one side of the module cover.

18. The steering column of the vehicle of claim 1, wherein, a fixing hole is formed at the other bended end of the bending plate, a pipe hole piped with the fixing hole is formed on both sides of the module cover, an actuator, in which a fixing pin is inserted or removed through the fixing hole and the pipe hole, is formed on one side of the module cover, and a fastening element is coupled to the fixing hole and the pipe hole on the other end of the actuator.

19. The steering column of the vehicle of claim 1, wherein the elastic element is coupled between the latching element and the module body.

20. The steering column of the vehicle of claim 1, wherein the fixing plate comprises stopping projections, and a telescope supporting element configured to be supported by the stopping projection of the fixing plate is formed at one end of the module body.

* * * * *